United States Patent [19]
Warner et al.

[11] 3,806,136
[45] Apr. 23, 1974

[54] SHAFT SEAL

[75] Inventors: Dale J. Warner, Chicago; Richard H. Jackson, Woodridge, both of Ill.

[73] Assignee: Gits Bros. Mfg. Co., Inc., Chicago, Ill.

[22] Filed: Apr. 27, 1972

[21] Appl. No.: 248,084

[52] U.S. Cl.................................. 277/40, 277/177
[51] Int. Cl........................... F16j 9/00, F16j 15/40
[58] Field of Search................... 277/40, 41, 85, 177

[56] References Cited
UNITED STATES PATENTS

| | | | |
|---|---|---|---|
| 3,552,752 | 1/1971 | Lojkutz | 277/40 |
| 3,319,968 | 5/1967 | Yost | 277/40 |
| 3,718,336 | 2/1973 | Jackson et al. | 277/40 |

Primary Examiner—Samuel B. Rothberg
Attorney, Agent, or Firm—Hill, Sherman, Meroni, Gross & Simpson

[57] ABSTRACT

A face type shaft seal having a take-apart stationary seal member which includes a substantially U-shaped axially open-ended housing with a carrier ring removably positioned within the housing in axially movable relationship spring-urged out of the open end, the carrier ring terminating at the open end in a radial face seal ring member, the carrier ring having an inner diameter face overlying an axial leg of the housing, the axial leg of the housing inward of the carrier ring having a circumferential groove therein, an O-ring received in the circumferential groove and the circumferential groove having an axial width greater than the O-ring whereby the O-ring can roll in the groove to accommodate axial movement of the carrier ring while maintaining a seal.

2 Claims, 2 Drawing Figures

PATENTED APR 23 1974 3,806,136

SHAFT SEAL

BACKGROUND OF THE INVENTION

1. Field of the Invention

This invention relates to fluid seals, more particularly to a face-type shaft seal.

2. Prior Art

Face-type shaft seals are old in the art, and have been produced in many embodiments. A recently successful adaptation of the older face seals has included take-apart capabilities which allows a seal ring or a seal carrier ring to be received in the housing of the non-rotatable assembly in a manner which allows it to be removed therefrom for replacement of the seal member easily.

A common feature of such face seals is the receipt of a radial face seal member in a U-shaped cross section axially open-end housing. The radial face seal member is generally received in axially movable fashion with the housing. The radial face which projects from the axial open end of the housing comprises a primary seal and mates at an interface with the radial face on a rotating seal member. In order to prevent pressure by-pass through the housing, a secondary seal is generally incorporated interior of the housing. It has been known to provide the secondary seal between an inner diameter face on either the member comprising the primary seal or a carrier ring which holds the member comprising the primary seal. In such cases, the secondary seal generally seals the area between an inner diameter axially extending leg of the housing and the inner diameter face on the aforementioned primary seal member.

A common type of seal used in the art is an O-ring seal. Generally, the O-ring is received in a circumferential groove in the inner diameter of the aforementioned primary seal associated member, and rides on the outer diameter of the radially innermost axial leg of the housing.

While such O-rings comprise effective secondary seals, they have a disadvantage in that they impede axial movement of the primary seal associated member. This requires an increase in axial spring pressure to maintain a sealing interface. Additionally, the O-ring imparts an undesirable hysteresis to the assembly. Further, the O-rings are normally squeezed upon installation so that a flattened face is provided retarding axial movement. All of this results in a higher primary seal pressure face contact, which results in increased heat caused by the rubbing surfaces both of the primary and secondary seals. This increases the amount of coking which forms during running of the seal in high-temperature oil.

It would be an advance in the art if a method and apparatus were devised which would eliminate the slide or deflection of the O-ring seal when used as a secondary seal between relatively axially movable members in a face-type shaft seal.

SUMMARY

This invention provides a solution to the aforementioned problems by first receiving the O-ring in a circumferential groove in the axially extending radially inner leg of the housing. Thus, the O-ring is primarily received in a non-axially movable portion of the assembly. Additionally, the inner diameter leg of the housing is constructed radially thicker than in prior art seals, whereby the groove receiving the O-ring can have a thickness greater than the radius of the O-ring.

A primary feature of this invention is the fact that the aforementioned circumferential groove is axially longer than the diameter of the O-ring and the O-ring is received in the groove in a manner which allows the O-ring to roll therein.

Thus, when the O-ring is received between the axially movable primary seal associated member, and the bottom wall of the groove, axial movement of the primary seal ring associated member will cause the O-ring to roll in the groove along with the axial movement. By constructing the groove of sufficient axial length to accommodate all normal movement of the primary seal ring associated member, it can be seen that the above-discussed deflection and sliding of the prior art O-rings is eliminated, and that the only impediment to movement of the primary seal ring associated member is the inherent resistance of the O-ring to rolling, which resistance is low compared to its slide resistance. This allows a reduction in seal pressure on the primary seal ring associated member.

It is therefore an object of this invention to provide an improved shaft seal.

It is a further object of this invention to provide a shaft seal having a housing carried seal assembly comprising both primary and secondary seals, wherein the secondary seal has a rolling contact with a primary seal associated member.

It is a more specific object of this invention to provide a non-rotating seal assembly for rotary face seals wherein the assembly has an axially movable primary seal received in the housing in contact with a secondary seal, the secondary seal comprising a rotatable O-ring received in an axially elongated circumferential groove on the radially inner wall of the housing.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which.

DESCRIPTION OF THE PREFERRED EMBODIMENT

Figures 1, 2:
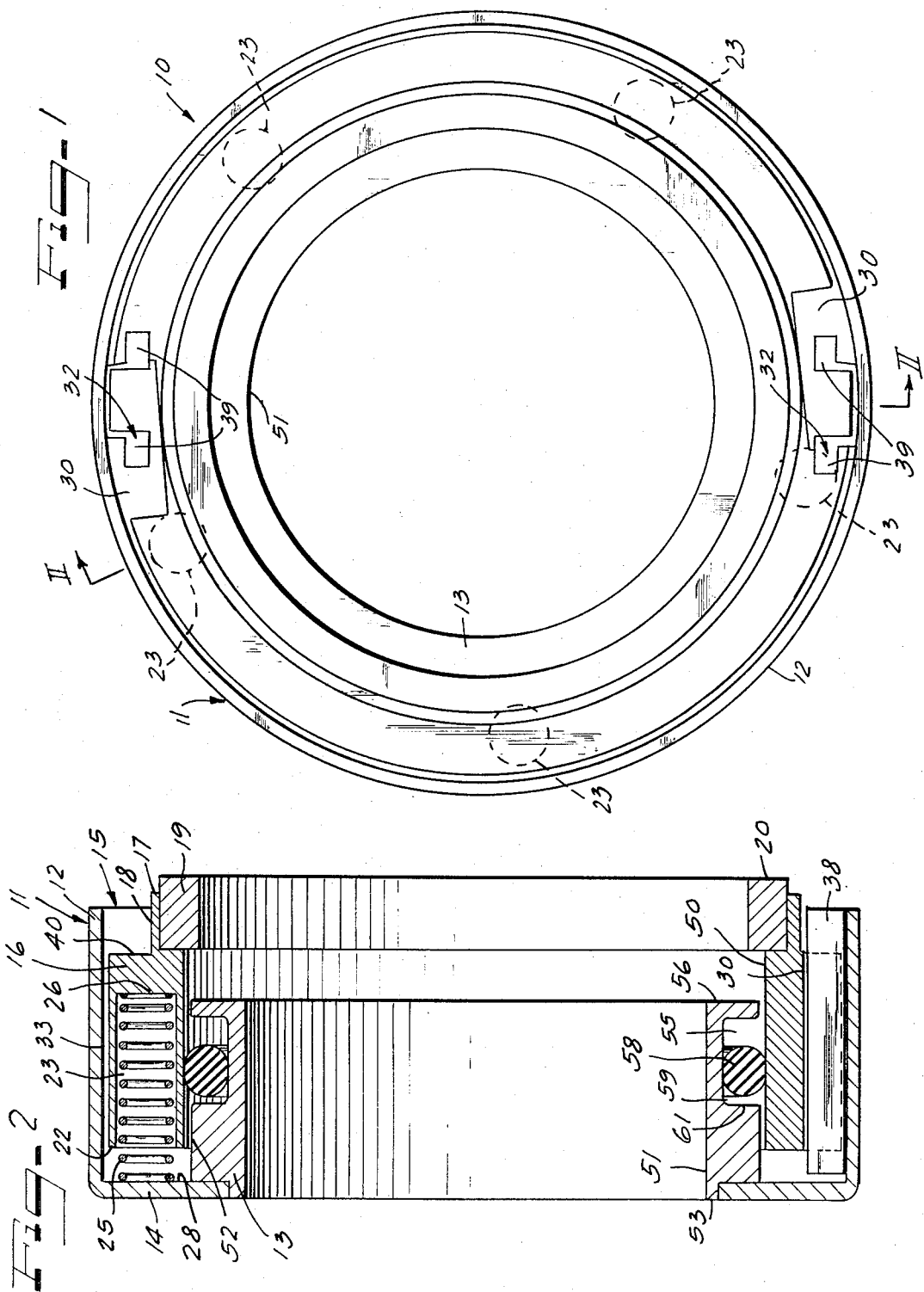
FIG. 1 is an end-plan view of the non-rotating seal assembly of this invention.
FIG. 2 is a cross-sectional view taken along the lines II—II of FIG. 1.

The figures illustrate a non-rotating seal assembly for use in a rotary face-type shaft seal. Such seals include a non-rotating assembly and a rotating assembly, the rotating assembly being attached to the shaft for rotation therewith and having a radial wall which comprises one face of the primary seal.

The non-rotating assembly has a member with a radial face comprising the other half of the primary seal. The assembly also comprises a secondary seal and means maintaining the primary seal faces in contact with one another. The assembly 10 of this invention comprises a housing 11 having radially outer 12 and inner 13 axially extending walls interconnected by a bight section or back wall 14. Opposite the wall 14 is an open end 15. In the embodiment illustrated, the inner wall 13 is axially shorter than the outer wall 12. Received into the housing is a carrier ring 16 which terminates in a reduced-diameter projection 17 from one end thereof which defines an inner diameter ledge 18 against which the primary seal member 19 is abutted. The primary seal member 19 projects beyond the portion 17 and has a radial face 20 which the radial face of the rotating assembly (not shown) rides on to form the primary seal.

The end 22 of the carrier ring 16 remote from the primary seal member 19 has a plurality of bores 23 extending thereinto. The bores 23, equidistantly spaced around the carrier ring, receive coil springs 25 which bottom on the back walls 26 of the bores 23 and on the inner surface 28 of the back wall 14 of the housing. The springs 25 urge the carrier ring out of the open end 15 of the housing.

Outer diameter axially extending channels 30 are formed at diametrically opposed points on the carrier ring. The channels reduce the outer diameter at those points. T-shaped rings 32 are attached to the inner diameter surface 33 of the outer wall 12. The keys have axially extending portions 38 which extend radially inward from the wall 11 to a point less than the non channel outer diameter of the carrier ring. The keys terminate at one axial end adjacent the opening 15 in out-turned legs 39. The legs 39 span a distance less than the distance of the grooves 39 whereby by aligning the channels 30 with the keys 32, the carrier ring may be inserted into the housing. Thereafter, rotating the carrier ring as illustrated in FIG. 1 until one of the legs 39 of each of the keys overlies the end wall 40 of the carrier ring will result in a restriction of the carrier ring against axial movement sufficient to extend it out of the housing completely. The keys also interact with the side walls of the channels to prevent rotation of the carrier ring in the housing. Thus, the keys and channels cooperate to provide both axial and rotational movement restrictions on the carrier ring. However, they cooperate to provide a take-apart feature which allows the carrier ring to be removed from the housing merely by rotating it to align the channels 30 with the keys 32.

The inner diameter 50 of the carrier ring 16 is greater than the outer diameter 52 of the inner wall 13 and the inner diameter 51 of the inner wall 13 is greater than the diameter of the shaft which the assembly is received around.

As illustrated in FIG. 2, the inner wall 13 is preferably formed with a stepped back wall 53 which extends radially beyond the back wall 14 and which is attached thereto as by spot welding. A circumferential groove 55 extends into the body of the inner wall 13 from the outer diameter 52 thereof. The groove 55 is preferably spaced closer to the end 56 of the inner wall, terminating at the open end 15 of the housing, then to the end 53 attached to the back wall 14. The groove 55 receives an O-ring seal 58. The groove preferably has a radial depth which is less than the diameter of the O-ring 58 by an amount slightly less than the space between the outer diameter 52 of the inner wall 13 and the inner diameter 50 of the carrier ring. In this way, the O-ring will be snugly received between the bottom wall 59 of the groove 55 and the inner diameter 50 of the carrier ring. Thus, the O-ring 58 serves as a secondary seal preventing pressure escape through the housing around the back of the carrier ring 16. The axial length of the groove 55 is greater than the diameter of the O-ring 58 whereby the O-ring is freely received axially within the groove. The dimension of the axial length of the groove is dependent upon the axial movement allowable in the carrier ring 16. Movement of the carrier ring 16 is limited by the relationship between the distance from the inside of the back wall 14 to the out-turned legs 39 of the keys 32 and the axial length of the carrier itself and the minimum length of the springs 25, if greater than the depth of the bores 23. The carrier is manufactured with an axial length less than the distance between the back wall 14 and the legs 39 so as to be movable therebetween. This axial movability allows the springs to maintain the primary seal face contact irrespective of wear of the seal face members. Further, axial shaft movement is accommodated in this manner.

The axial length of the groove 55 is preferably such that when the carrier ring is backed against the back wall 14 and the O-ring seal is backed against the back wall 61 of the groove 55, the axial length of the groove will allow the O-ring to roll in the groove to accommodate full axial movement of the carrier ring until it contacts the legs 39 of the key without causing a sliding condition between the inner diameter 50 of the carrier ring and the O-ring. Thus, as the carrier moves axially in the housing, the O-ring seal will roll in the groove to eliminate a sliding face between the carrier and the O-ring surface.

It can therefore be seen from the above that our invention provides a non-rotating axially movable seal assembly for a rotary shaft face seal wherein a rolling surface secondary seal is provided between an O-ring freely received in an axially elongated groove and a carrier ring axially movable in a housing, the groove formed in one wall of the housing.

Although the teachings of our invention have herein been discussed with reference to specific theories and embodiments, and although illustrative means for accomplishing explained results have been described, it is to be understood that these are by way of illustration only and that others may wish to utilize our invention in different designs or applications.

We claim as our invention:

1. In a shaft seal having a non-rotating seal assembly including a U-shaped cross section housing with an axially open-end, a primary seal associated member received in said housing for axial movement therein and restrained against rotation therein and a secondary seal between a portion of the primary seal associated member and a wall of the housing, the improvement of the secondary seal member comprising an O-ring received in a groove, the groove extending radially into an inner diameter wall of the housing, the groove having an axial length greater than the diameter of the O-ring, the O-ring having contact with the bottom wall of the groove and with an axially extending surface of the primary seal associated member, the O-ring free to roll within the groove to accommodate axial movement of the primary seal associated member, axial movement of the primary seal associated member being limited and the axial length of the groove is sufficient to allow the O-ring to roll in the groove to accommodate the axial movement of the primary seal associated member to the extent possible within the limits of movement of the primary seal associated member without sliding contact between the O-ring and the primary seal associated member or between the O-ring and the wall of the housing.

2. A non-rotating seal assembly for a rotary shaft seal comprising: a housing, said housing being a ring and U-shaped in cross section with inner and outer diameter axially extending legs and a radial wall interconnecting the legs at one axial end thereof, the other axial end open, a primary seal carrier ring received in said housing in axially movable relation, said carrier ring having a portion thereof received between the inner end and outer diameter legs, said portion having an inner diameter surface, spring means urging said carrier ring axially out of the open end, means limiting axial movement of the carrier ring, means preventing rotation of the carrier ring, a circumferential groove in the outer diameter of the inner diameter leg, an O-ring seal received in said groove, said O-ring seal in contact with the bottom wall of said groove and with the inner diameter surface of said carrier ring, the circumferential groove having an axial dimension greater than the diameter of said O-ring seal, said O-ring rotatable within said groove, and said O-ring seal accommodating axial movement of the carrier ring by rotation without sliding between the inner diameter surface of the carrier ring and the surface of the O-ring, the axial dimension of the circumferential groove being substantially as long as the axial movability of the carrier ring within the limits set upon the axial movement of the carrier ring by the said means limiting axial movement of the carrier ring.

* * * * *